US008867008B2

(12) United States Patent
Lee et al.

(10) Patent No.: US 8,867,008 B2
(45) Date of Patent: Oct. 21, 2014

(54) BLUE PHASE LIQUID CRYSTAL DISPLAY DEVICE

(75) Inventors: Sang-Wook Lee, Gyeonggi-do (KR); Hyun-Jin Park, Gyeonggi-do (KR); Eun-Jung Lim, Gyeonggi-do (KR); Dong-Kyu Yoon, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 842 days.

(21) Appl. No.: 12/958,976

(22) Filed: Dec. 2, 2010

(65) Prior Publication Data
US 2011/0141424 A1    Jun. 16, 2011

(30) Foreign Application Priority Data
Dec. 11, 2009   (KR) .................. 10-2009-0123493

(51) Int. Cl.
| G02F 1/1343 | (2006.01) |
| C09K 19/02 | (2006.01) |
| C09K 19/44 | (2006.01) |
| C09K 19/22 | (2006.01) |

(52) U.S. Cl.
CPC ............. C09K 19/0275 (2013.01); C09K 19/44 (2013.01); C09K 19/22 (2013.01)
USPC ............... 349/146; 349/133; 349/33

(58) Field of Classification Search
CPC ........................ G02F 1/1392–1/1393
USPC ........................................... 349/146
See application file for complete search history.

(56) References Cited

U.S. PATENT DOCUMENTS 7,518,700 B2 *   4/2009   Shibahara et al. ............ 349/167
8,395,743 B2 *   3/2013   Kim et al. ..................... 349/146

OTHER PUBLICATIONS

Kikuchi et al., "62.2: Invited Paper: Fast Electro-Optical Switching in Polymer-Stabilized Liquid Crsytalline Blue Phases for Display Application," SID 07 Digest, pp. 1737-1740 (2007).

* cited by examiner

*Primary Examiner* — Eric Wong
(74) *Attorney, Agent, or Firm* — Birch, Stewart, Kolasch & Birch, LLP

(57) ABSTRACT

A blue phase liquid crystal display device includes a first substrate having a first pixel region, a first gate line on the first substrate, first and second data lines on the first substrate, a first thin film transistor (TFT) and a second TFT disposed in the first pixel region, the first TFT connected to the first gate line and the first data line, and the second TFT connected to the first gate line and the second data line, a first pixel electrode in the first pixel region and connected to the first TFT, and a second pixel electrode in the first pixel region and connected to the second TFT, a second substrate facing the first substrate, and a liquid crystal layer between the first and second substrates, the liquid crystal layer having an optical isotropic property without an electric field and a birefringence property with the electric field.

21 Claims, 7 Drawing Sheets

BLUE PHASE LIQUID CRYSTAL DISPLAY DEVICE

The present application claims the benefit of Korean Patent Application No. 10-2009-0123493, filed in Korea on Dec. 11, 2009, which is hereby incorporated by reference.

BACKGROUND OF THE INVENTION

1. Field of the Invention

The present invention relates to a liquid crystal display (LCD) device, and more particularly, to a blue phase LCD device requiring a reduced driving voltage and preventing a color shift problem.

2. Discussion of the Related Art

As society has entered in earnest upon an information age, the field of display devices that represent electrical signals as visual images has developed rapidly. Particularly, the liquid crystal display (LCD) device or the OELD device as a flat panel display device having characteristics of light weight, thinness and low power consumption is developed to be used as a substitute for a cathode-ray tube type display device.

Among these devices, since the LCD device is adequate to display moving images and has a high contrast ratio, the LCD device has been widely used. The LCD devices use optical anisotropy and polarization properties of liquid crystal molecules to display images. Generally, the liquid crystal molecules are classified into a nematic liquid crystal molecule, a smectic liquid crystal molecule and a cholesteric liquid crystal molecule. The nematic liquid crystal molecule is very widely used.

Unfortunately, since a response rate of the liquid crystal molecules is too low, problems are caused. In addition, there is another problem of a narrow viewing angle without multi-alignment layers or an additional optical film.

To resolve these problems, a blue phase liquid crystal molecule is introduced to obtain a high response rate. Since the blue phase liquid crystal molecule has an isotropic property or an anisotropic property depending on a voltage, a viewing angle of the LCD device is improved. Unfortunately, the LCD device including the blue phase liquid crystal molecule, i.e., a blue phase LCD device, requires a high driving voltage. In addition, when the images from the blue phase LCD device, which is driven by a horizontal electric field, is observed at an oblique angle, a color shift problem or an image distorting problem is caused. Namely, there is still a viewing angle problem.

SUMMARY OF THE INVENTION

Accordingly, the present invention is directed to a blue phase LCD device that substantially obviates one or more of the problems due to limitations and disadvantages of the related art.

An object of the present invention is to reduce a driving voltage for a blue phase LCD device.

Another object of the present invention is to prevent a color shift problem in a blue phase LCD device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, exemplary embodiments of the invention are described herein.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

The LCD device according to the present invention includes blue phase liquid crystal molecules in a liquid crystal layer. The blue phase liquid crystal molecule is an isotropic type. In more detail, when no voltage is applied, the blue phase liquid crystal molecule has an optical isotropic property in two or three dimensions. When a voltage is applied, the blue phase liquid crystal molecule has a birefringence property along one direction. Namely, when the voltage is applied, the blue phase liquid crystal molecule has an optically uniaxial property. Accordingly, like the nematic liquid crystal molecule, the blue phase liquid crystal molecule has a viewing angle dependency in transmittance with the voltage. On the other hand, since there is no initial alignment with an optical anisotropic in the isotropic liquid crystal molecule, the blue phase liquid crystal molecule is aligned along a direction of an electric field unlike the nematic liquid crystal molecule.

Figure 1:
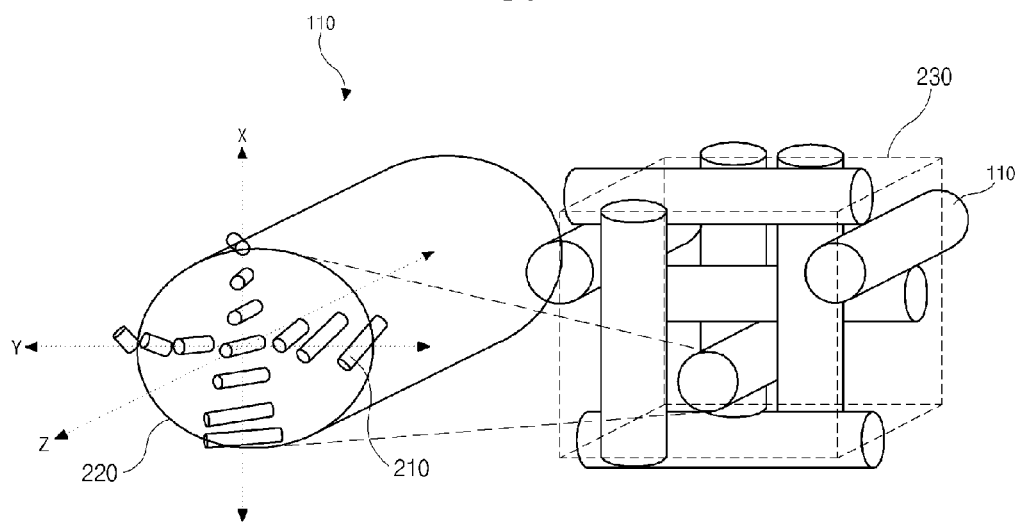
FIG. 1 is a view illustrating a principle of blue phase liquid crystal molecules.

FIG. 1 is a view illustrating a principle of blue phase liquid crystal molecules. As shown in FIG. 1, the blue phase liquid crystal molecules 210 are disposed in a cylinder in a twisted shape. This is referred to as a double twist cylinder (DTC) structure 220. As it goes to an outer direction from a central axis of the DTC structure 220, the blue phase liquid crystal molecule 210 is more twisted. Namely, the blue phase liquid crystal molecule 210 is twisted along two twisted axes X and Y, which are perpendicular to each other, in the DTC structure 220. As a result, the blue phase liquid crystal molecule 210 in the DTC structure 220 has a directional characteristic with respect to the central axis of the DTC structure 220. The DTC structures 220 are arranged in a lattice structure 230.

Properties of the blue phase liquid crystal molecule 210 are generated at a temperature range between that of a chiral nematic phase liquid crystal molecule and that of an isotropic phase liquid crystal molecule. Namely, since the properties of the blue phase liquid crystal molecule 210 are generated at a narrow temperature range of 1 to 2 degrees, temperature control is an important fact.

The blue phase liquid crystal molecule 210 is stabilized with a polymer. When the blue phase liquid crystal molecule 210 is mixed with the polymer, the polymer is combined more with a liquid crystal molecule not having a directional characteristic than with a liquid crystal molecule having a directional characteristic. As a result, the DTC structures 220 are stabilized in the lattice structure 230 such that a temperature range for the polymer-stabilized blue phase liquid crystal molecule is increased to a temperature range of 0 to 50 degrees.

For example, the blue phase liquid crystal molecule may be selected from a material of formulas I to III below.

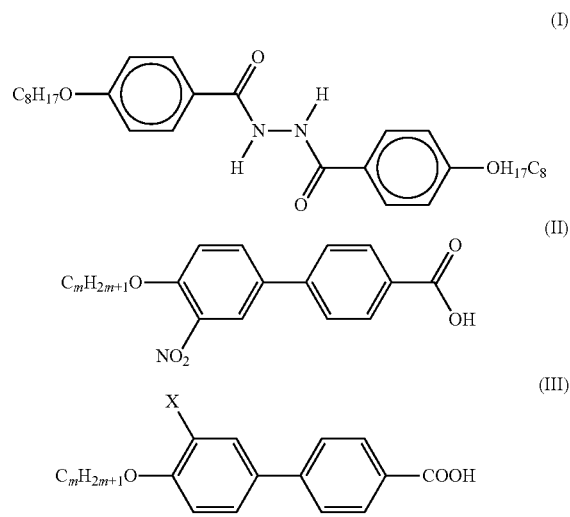

Alternatively, the blue phase liquid crystal molecule is formed of 4-cyano-4'-phenylbiphenyl. In addition, a mixture of the above four materials may be used for the blue phase liquid crystal molecule. The blue phase liquid crystal molecule of the present invention further includes monomer, photo-initiator and binder as a polymer. The blue phase liquid crystal molecule is stabilized by the polymer.

The monomer is a compound being capable of being polymerized with light and having a carbon-carbon unsaturated bonding or a carbon-carbon ring-shape bonding. For example, the monomer is selected from an acrylate-based compound such as one of 1,3-butyleneglycoldiacrylate, 1,4-butadiolacrylate and ethyleneglycoldiacrylate.

The photo-initiator for photopoylmerization includes at least one acetophenon-based compound. For example, the photoinitiator includes at least one of diethoxyacetophenon, 2-methyl-2-monopolyno-1-(4-methylthiophenyl)propane-1-on and 2-hydroxy-2-methyl-1-phenylpropane-1-one. The photo-initiator may further include at least one of benzoin-based compound, benzophenon-based compound, thioxanthone-based compound and triazine-based compound. For example, benzoin-based compound is selected from benzoin, benzoinmethylether and benzomethylether. Thioxanthone-based compound is selected from 2-isopropylthioxanthone, 4-isopropylthioxanthone and 2,4-diethylthioxanthone. Triazine-based compound is selected from 2,4-bis(chloromethyl)-6-(4-methoxyphenyl)-1,3,5-triazine and 2,4-bis(chloromethyl)-6-(4-methoxynaphthyl)-1,3,5-triazine.

The binder is an acryl-based copolymer. The acryl-based copolymer may include a monomer having a carboxyl-group and another monomer being capable of being co-polmerized with the monomer. The monomer having a carboxyl-group may be non-saturated carboxylic acid. For example, non-saturated carboxylic may be selected from acrylic acid, methacryllic acid and crotonic acid. In addition, another monomer being capable of being co-polmerized with the monomer may be selected from stylene, alpha-methylstylene and ortho-binyltoluene.

The polymer-stabilized blue phase liquid crystal molecules are randomly arranged without an electric field, while the polymer-stabilized blue phase liquid crystal molecules are arranged along an electric flux with an electric field.

Figure 2A:
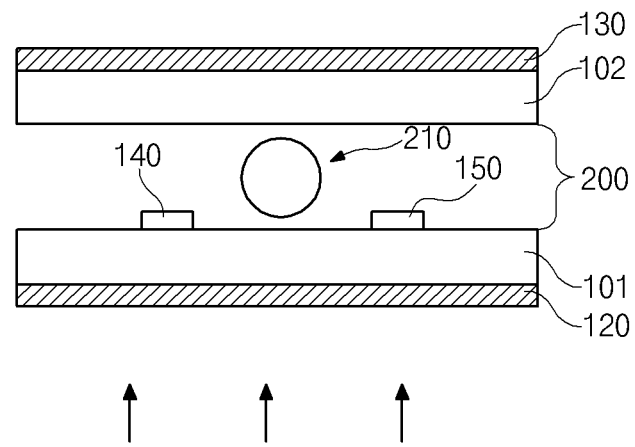
FIGS. 2A and 2B are cross-sectional views of an off condition and an on condition in a blue phase LCD device, respectively.
Figure 2B:
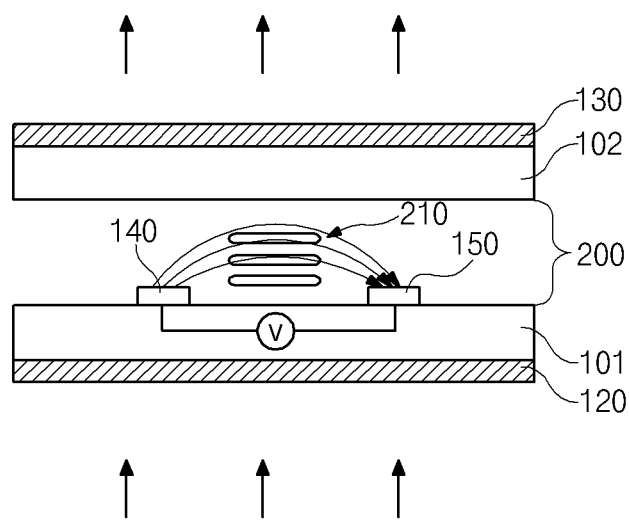

FIGS. 2A and 2B are cross-sectional views of an off condition and an on condition in a blue phase LCD device, respectively. The blue phase LCD device 100 includes a liquid crystal panel and a backlight unit. The backlight unit is disposed under the liquid crystal panel and provides light to the liquid crystal panel. The liquid crystal panel includes a first substrate 101, a second substrate 102 and a blue phase liquid crystal layer 200 interposed therebetween. The liquid crystal panel further includes first and second polarizing plates 120 and 130 respectively disposed on an outer side of the first and second substrates 101 and 102.

When blue phase liquid crystal molecules 210 are arranged to be parallel to a horizontal electric field, the liquid crystal panel has a maximum transmittance. Accordingly, to obtain a maximum brightness, a polarizing axis of the first polarizing plate 120 is perpendicular to that of the second polarizing plate 130. In addition, each of the polarizing axes of the first and second polarizing plates 120 and 130 has an angle of about 45 degrees with respect to a direction of the electric field.

Referring to FIG. 2A, without an electric field between two electrodes 140 and 150, i.e., an off state, since the DTCs 220 (of FIG. 1) of the blue phase liquid crystal molecules 210 has a sphere shape, the blue phase liquid crystal layer 200 has an isotropic property. As a result, the light from the backlight unit is not transmitted through the blue phase liquid crystal layer 200 such that the LCD device has a black state.

Referring to FIG. 2B, with an electric field between the two electrodes 140 and 150, i.e., an on state, since the lattice structure 230 (of FIG. 1) of the DTCs 220 (of FIG. 1) of the blue phase liquid crystal molecules 210 is distorted, the blue phase liquid crystal layer 200 has an birefringence property along one direction. Namely, the blue phase liquid crystal molecule 210 has a elliptical shape perpendicular to the electric field. As a result, the blue phase liquid crystal layer 200 has an anisotropic property. Linear-polarized light parallel to the polarizing axis of the first polarizing plate 120 is only transmitted through the first polarizing plate 120, and linear-polarized light parallel to the blue phase liquid crystal molecule 210 is only transmitted through the blue phase liquid crystal layer 200. In addition, linear-polarized light parallel to the polarizing axis of the second polarizing plate 130 is only transmitted through the second polarizing plate 130. As a result, in the on state, the LCD device has a white state. As explained above, since the lattice structure 230 having a symmetric structure is distorted by the electric field to have the birefringence property, the liquid crystal display device has an excellent white state. A direction of the birefringence is constant, and an intensity of the birefringence is changed depending on an intensity of the electric field. Namely, by changing the intensity of the electric field generated between the two electrodes 140 and 150, an optical characteristic of the LCD device is controlled.

To efficiently control transmittance of the blue phase LCD device, a polarizing axis of the first polarizing plate 120 is perpendicular to a polarizing axis of the second polarizing plate 130. In addition, a direction of the electric field is parallel to the first substrate 101. Namely, an in-plane switching (IPS) mode LCD device is adequate to control the blue phase liquid crystal molecules.

Figure 3:
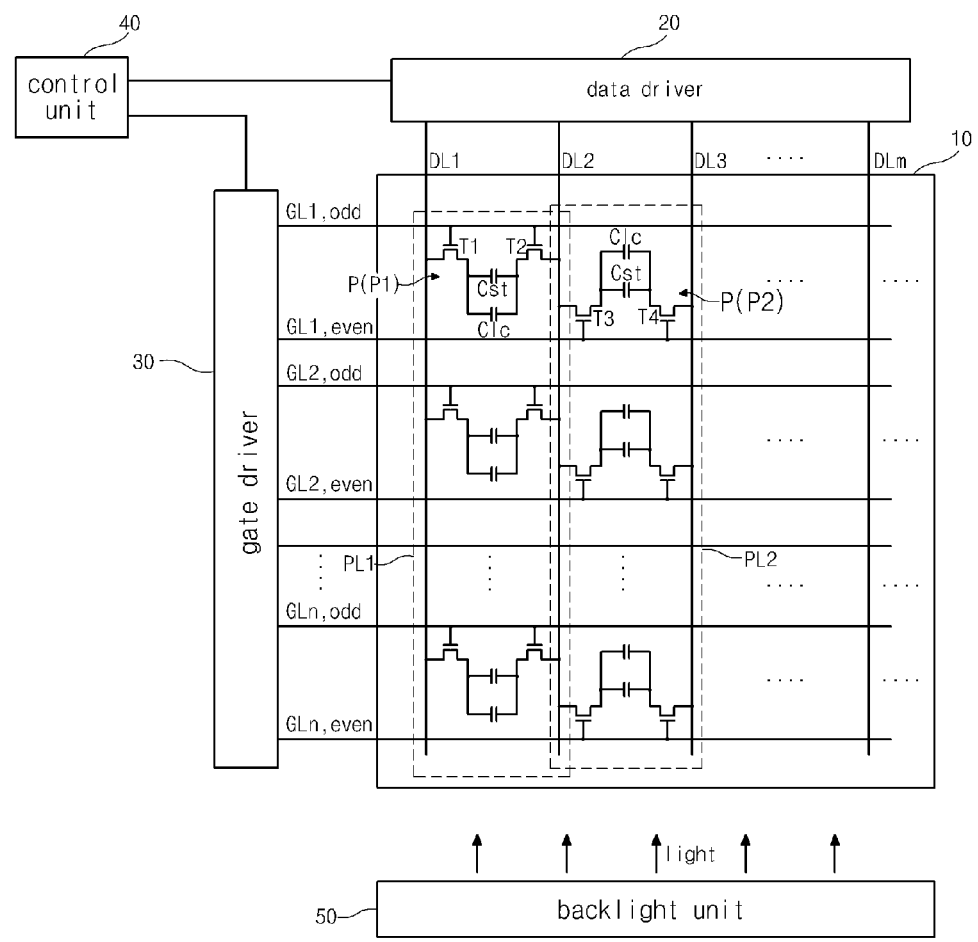
FIG. 3 is a circuit diagram of a blue phase LCD device according to an exemplary embodiment of the present invention.

FIG. 3 is a circuit diagram of a blue phase LCD device according to an exemplary embodiment of the present invention. Referring to FIG. 3, the blue phase LCD device includes a liquid crystal panel 10 for displaying images, a data driver 20, a gate driver 30, a control unit 40 for controlling the data and gate drivers 20 and 30, and a backlight unit 50 for providing light to the liquid crystal panel 10. The control unit 40 provides a data control signal for controlling the data driver 20 and a data signal modulated by the data control signal. In addition, the control unit 40 provides a gate control signal for controlling the gate driver 30.

The gate driver 30 provides a gate signal of a pulse shape according to the gate control signal to a plurality gate lines "GL1, odd" to "GLn, even" such that thin film transistors (TFTs) "T1", "T2", "T3" and "T4" is controlled. Namely, the gate lines "GL1, odd" to "GLn, even" are scanned by the gate driver 30. The data driver 20 generates a data voltage corresponding to the data signal from the control unit 40. The data voltage is supplied to a plurality of data lines "DL1" to "DLm".

The TFTs "T1" to "T4" are disposed in a pixel region "P", which is defined by crossing the gate lines "GL1, odd" to "GLn, even" and the data lines "DL1" to "DLm", and are connected to the gate lines "GL1, odd" to "GLn, even" and the data lines "DL1" to "DLm". In the present invention, two thin film transistors are disposed in one pixel region "P".

In more detail, the pixel regions "P" are classified into a first pixel line "PL1" and a second pixel line "PL2". Namely, the pixel regions "P" disposed between the first data line "DL1" and the second data line "DL2" are referred to as the first pixel line "PL1", and the pixel regions "P" disposed between the second data line "DL2" and the third data line "DL3" are referred to as the second pixel line "PL2". In other word, the pixel regions "P" disposed between (2n−1)th data line and (2n)th data line are referred to as the first pixel line "PL1", and the pixel regions "P" disposed between the (2n)th data line and the (2n+1)th data line are referred to as the second pixel line "PL2".

The first TFT "T1" and the second TFT "T2" are disposed in the first pixel region "P1" of the first pixel line "PL1". The first TFT "T1" is connected to the first odd number gate line "GL1, odd" and the first data line "DL1", and the second TFT "T2" is connected to the first odd number gate line "GL1, odd" and the second data line "DL2". Namely, one TFT in one pixel region "P" in the first pixel line "PL1" is connected to an odd number gate line and the (2n−1)th data line, and the other one TFT in one pixel region "P" in the first pixel line "PL1" is connected to the odd number gate line and the (2n)th data line.

Although not shown, a first pixel electrode, which is connected to the first TFT "T1", and a second pixel electrode, which is connected to the second TFT "T2", are alternatively arranged with each other in one pixel region "P" of the first pixel line "PL1". A horizontal electric field is generated between the first and second pixel electrodes to drive the blue phase liquid crystal molecules. First and second data voltages, which have different phases, are supplied to the first and second pixel electrodes through the first and second data lines "DL1" and "DL2", respectively. For example, one of the first and second data voltages is a positive voltage, and the other one of the first and second data voltages is a negative voltage. If the positive voltage and the negative voltage are supplied to the first data line "DL1" and the second data line "DL2" in one frame, respectively, the negative voltage and the positive voltage are supplied to the first data line "DL1" and the second data line "DL2" in the other one frame, respectively.

The third TFT "T3" and the fourth TFT "T4" are disposed in one pixel region "P2" of the second pixel line "PL2". The third TFT "T3" is connected to a first even number gate line "GL1, even" and the second data line "DL2", and the fourth TFT "T4" is connected to the first even number gate line "GL1, even" and the third data line "DL3". Namely, one TFT in one pixel region "P" in the second pixel line "PL2" is connected to an even number gate line and the (2n)th data line, and the other one TFT in one pixel region "P" in the second pixel line "PL2" is connected to the even number gate line and the (2n+1)th data line.

Although not shown, a first pixel electrode, which is connected to the third TFT "T3" and a second pixel electrode, which is connected to the fourth TFT "T4", are alternatively arranged with each other in one pixel region "P" of the second pixel line "PL2". A horizontal electric field is generated between the first and second pixel electrodes to drive the blue phase liquid crystal molecules. First and second data voltages, which have different phases, are supplied to the first and second pixel electrodes through the second and third data lines "DL2" and "DL3", respectively. For example, one of the first and second data voltages is a positive voltage, and the other one of the first and second data voltages is a negative voltage. If the positive voltage and the negative voltage are supplied to the second and third data lines "DL2" and "DL3" in one frame, respectively, the negative voltage and the positive voltage are supplied to the second and third data lines "DL2" and "DL3" in the other one frame, respectively.

A liquid crystal capacitor "Clc" and a storage capacitor "Cst" are disposed in each pixel region "P" and are connected in parallel to two TFTs in one pixel region "P". The liquid crystal capacitor "Clc" is controlled by the TFTs and transmits light depending on the data voltages. The storage capacitor "Cst" storages the data voltages when the TFT is turned on. When the TFT is turned off, the storage capacitor "Cst" provides the stored voltages into the liquid crystal capacitor "Clc". Namely, the data voltages applied to each pixel electrode in one frame is stored by the next frame.

The gate signals are successively supplied to the gate lines "GL1, odd" to "GLn, even" such that the TFTs in each pixel regions P are successively controlled. Namely, when the gate signal is supplied to the first odd number gate line "GL1, odd", the first and second TFTs "T1" and "T2" in the first pixel region "P1" of the first pixel line "PL1" are turned on. Accordingly, the first data voltage is applied to the first pixel electrode through the first data line "DL1" and the first TFT "T1", and the second data voltage is applied to the second pixel electrode through the second data line "DL2" and the second TFT "T2". On the other hand, when the gate signal is supplied to the first even number gate line "GL1, even", the third and fourth TFTs "T3" and "T4" in the first pixel region "P1" of the second pixel line "PL2" are turned on. Accordingly, the second data voltage is applied to the first pixel electrode through the second data line "DL2" and the third TFT "T3", and the third data voltage is applied to the second pixel electrode through the third data line "DL3" and the fourth TFT "T4".

As explained above, the data driver 20 is an inversion driving type. Although not shown, a output line selecting member is formed at an output terminal of the data driver 20 such that the data voltages are selectively supplied to odd number data lines and even number data lines. Namely, data voltages having different polarities are alternatively supplied to the odd number data lines and even number data lines in one frame and the next frame. For example, in an odd number frame, the data driver 20 supplies a positive data voltage to the odd number data lines "DL1", "DL3" ... "DL(2n-1)" and a negative data voltage to the even number data lines "DL2", "DL4" ... "DL(2n)". In even number frame, the data driver 20 supplies a negative data voltage to the odd number data lines "DL1", "DL3" ... "DL(2n-1)" and a positive data voltage to the even number data lines "DL2", "DL4" ... "DL(2n)". This may be referred to as a line and frame inversion driving type. Since a voltage difference between the first and second pixel electrodes in the LCD device according to the present invention is twice as much as that in the related art LCD device, the liquid crystal layer is powerfully driven. Since the liquid crystal layer can be driven by the smaller voltages, a driving voltage is decreased such that power consumption is also decreased.

Figure 4:
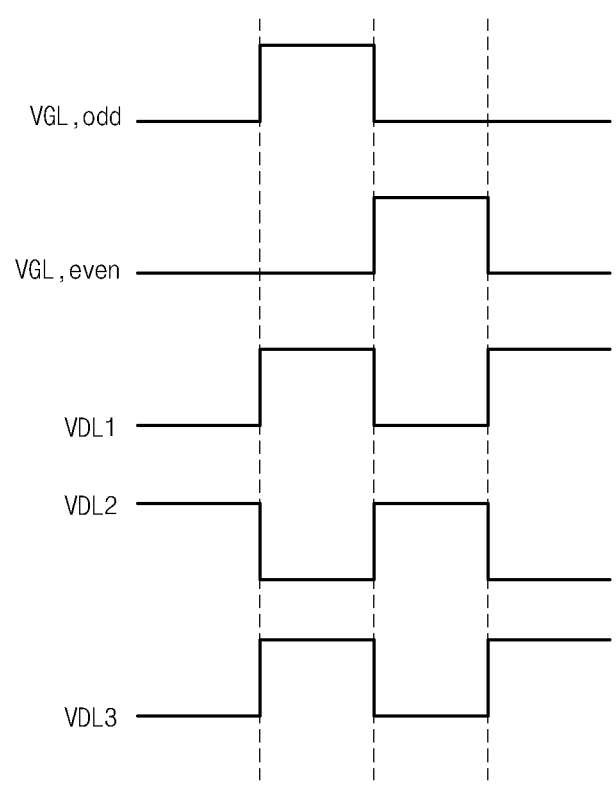
FIG. 4 is a graph showing a signal wave shape for driving a blue phase LCD device according to the present invention.

FIG. 4 is a graph showing a signal wave shape for driving a blue phase LCD device according to the present invention. When the odd number gate line "GL, odd" is selected by a first scan signal, at the pixel region "P" of the first pixel line "PL1", a positive data voltage is supplied to the odd number data line "DL1" and a negative data voltage is supplied to the even number data line "DL2". When the even number gate line "GL, even" is selected by a second scan signal, a negative data voltage is supplied to the odd number data line "DL1" and a positive data voltage is supplied to the even number data line "DL2". Alternatively, a dot inversion driving type may be used for the blue phase LCD device according to the present invention.

Figure 5:
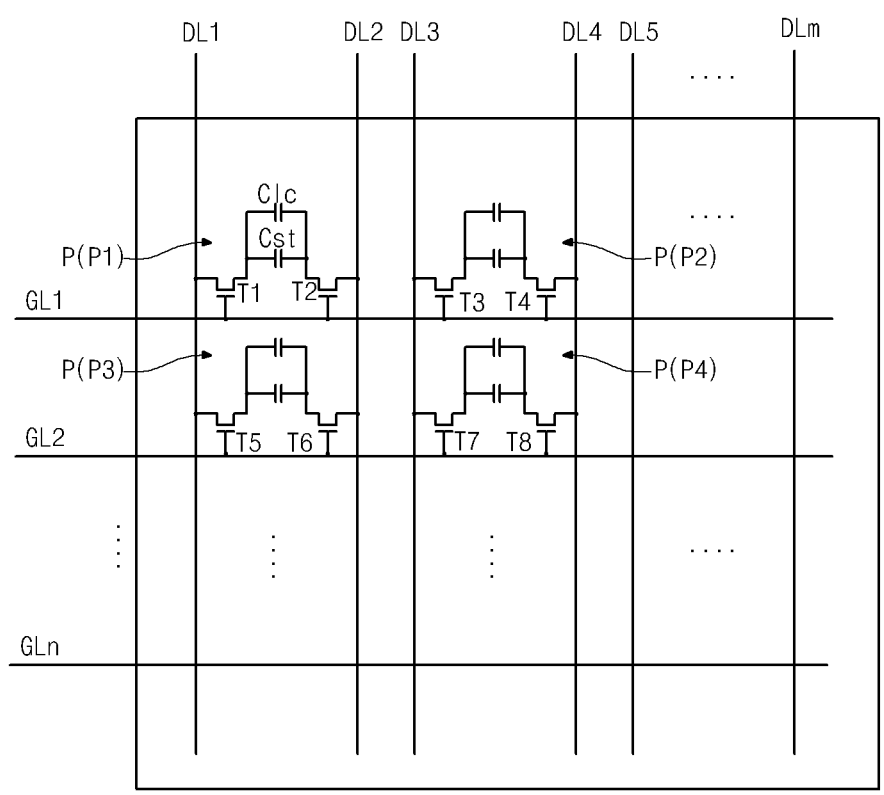
FIG. 5 is a circuit diagram of a blue phase LCD device according to an exemplary embodiment of the present invention.

FIG. 5 is a circuit diagram of a blue phase LCD device according to an exemplary embodiment of the present invention. Referring to FIG. 5, the pixel regions "P" are defined by crossing of the gate lines "GL1" to "GLn" and the data lines "DL1" to "DLm". There are two TFTs in each pixel region "P". One TFT of the two TFTs is connected to one of the gate lines "GL1" to "GLn" and one of the odd number data lines "DL1", "DL3" ... "DL(2n-1)". The other one TFT of the two TFTs is connected to the one of the gate lines "GL1" to "GLn" and one of the even number data lines "DL2", "DL4" ... "DL(2n)". Namely, the one TFT in an (n) th pixel region is connected to an (m)th gate line and a (2n-1)th data line, and the other one TFT in the (n) th pixel region is connected to the (m)th gate line and a (2n)th data line. A liquid crystal capacitor "Clc" and a storage capacitor "Cst" are disposed in each pixel region "P" and are connected in parallel to two TFTs in one pixel region "P".

Four pixel regions "P" are arranged in a two by two matrix shape. The four pixel regions "P" are defined by the first and second gate lines "GL1" and "GL2" and the first to fourth data lines "DL1", "DL2", "DL3" and "DL4". In the first pixel region "P1", the first TFT "T1" is connected to the first gate line "GL1" and the first data line "DL1", and the second TFT "T2" is connected to the first gate line "GL1" and the second data line "DL2". In the second pixel region "P2", the third TFT "T3" is connected to the first gate line "GL1" and the third data line "DL3", and the fourth TFT "T4" is connected to the first gate line "GL1" and the fourth data line "DL4". In the third pixel region "P3", the fifth TFT "T5" is connected to the second gate line "GL2" and the first data line "DL1", and the sixth TFT "T6" is connected to the second gate line "GL2" and the second data line "DL2". In the fourth pixel region "P4", the seventh TFT "T7" is connected to the second gate line "GL2" and the third data line "DL3", and the eighth TFT "T8" is connected to the second gate line "GL2" and the fourth data line "DL4".

Although not shown, a first pixel electrode, which is connected to the first TFT "T1" and a second pixel electrode, which is connected to the second TFT "T2", are alternatively arranged with each other in the first pixel region "P1". Similarly, there are first and second pixel electrodes in the second to fourth pixel regions "P2", "P3" and "P4". First and second data voltages, which have different phases and the same intensity, are supplied to the first and second pixel electrodes through the first and second data lines "DL1" and "DL2", respectively. For example, one of the first and second data voltages is a positive voltage, and the other one of the first and second data voltages is a negative voltage. A horizontal electric field is generated between the first and second pixel electrodes to drive the blue phase liquid crystal molecules.

Figure 6:
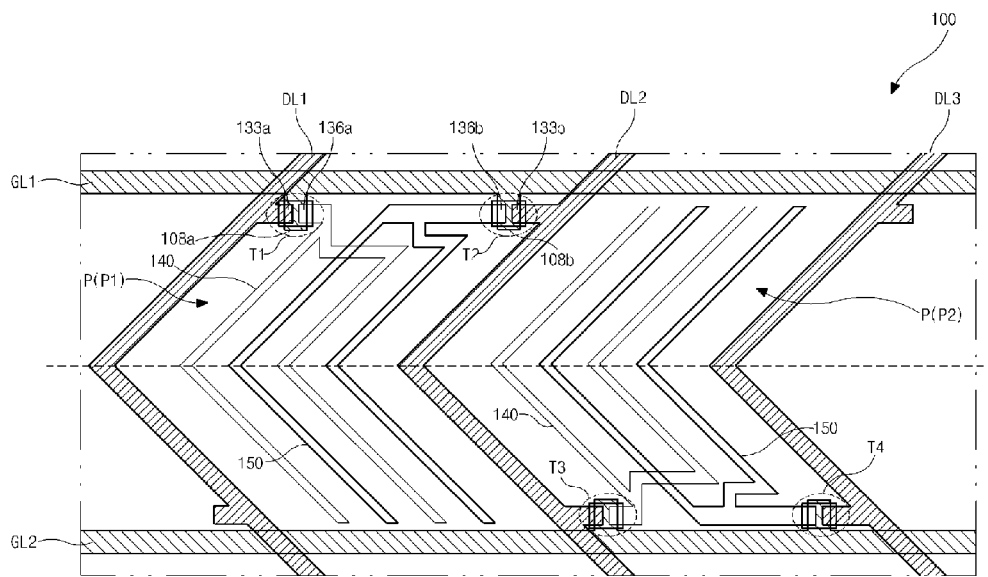
FIG. 6 is a plane view of an array substrate of a blue phase LCD device according to the present invention.

To resolve a color shift problem or an image distorting problem, a blue phase LCD device is introduced with reference to FIG. 6. FIG. 6 is a plane view of an array substrate of a blue phase LCD device according to the present invention. As shown in FIG. 6, each of the first and second pixel electrodes 140 and 150 is oblique to the gate lines GL1 and GL2 and has a bent portion. Each of the first and second pixel electrodes 140 and 150 has a generally symmetric shape with respect to the bent portion.

In the array substrate, first and second gate lines "GL1" and "GL2" and first to third data lines "DL1", "DL2" and "DL3" are disposed on a substrate 100. The first and second gate lines "GL1" and "GL2" cross the first to third data lines "DL1", "DL2" and "DL3" to define first and second pixel regions "P1" and "P2". For example, each of the first and second pixel electrodes 140 and 150 has an angle of about 45 degrees with respect to a line parallel to the gate lines "GL1" and "GL2" to form multi-domains. As a result, there is no color shift problem with a wide viewing angle. In addition, there is no image distorting problem. Furthermore, the liquid crystal molecules are arranged by 90 degrees with one another such that a viewing angle dependency is overcome.

In this case, a polarizing axis of first and second polarizing plates (not shown), which are respectively disposed on an outer side of the substrate for the array substrate and an outer side of a substrate for the color filter substrate, is oblique to the first and second pixel electrodes 140 and 150 and perpendicular to each other. For example, the polarizing axis of first and second polarizing plates has an angle of about 45 degrees with respect to the first and second pixel electrodes 140 and 150. Namely, the polarizing axis of the first polarizing plate is perpendicular to the gate lines "GL1" and "GL2", and the polarizing axis of the second polarizing plate is parallel to the gate lines "GL1" and "GL2".

In the pixel region "P1" of the first pixel line "PL1" (of FIG. 3), the first and second TFTs "T1" and "T2" are disposed. The first TFT "T1" is connected to the first gate line "GL1" and the first data line "DL1". The first TFT "T1" includes a first gate electrode 108a, a first gate insulating layer (not shown), a first active layer (not shown) of intrinsic amorphous silicon, a first ohmic contact layer (not shown) of impurity-doped amorphous silicon, a first source electrode 133a and a first drain electrode 136a. The first gate electrode 108a is connected to the first gate line "GL1", and the first gate insulating layer covers the first gate electrode 108a. The first active layer is disposed on the first gate insulating layer and overlaps the first gate electrode 108a. The first ohmic contact layer is disposed on the first active layer. The first source electrode 133a is disposed on the first ohmic contact layer and is connected to the first data line "DL1". The first drain electrode 136a is disposed on the first ohmic contact layer and is spaced apart from the first source electrode 133a.

The second TFT "T2" is connected to the first gate line "GL1" and the second data line "DL2". The second TFT "T2" includes a second gate electrode 108b, a second gate insulating layer (not shown), a second active layer (not shown) of intrinsic amorphous silicon, a second ohmic contact layer (not shown) of impurity-doped amorphous silicon, a second source electrode 133b and a second drain electrode 136b. The second gate electrode 108b is connected to the first gate line "GL1", and the second gate insulating layer covers the second gate electrode 108b. The second active layer is disposed on the second gate insulating layer and overlaps the second gate electrode 108b. The second ohmic contact layer is disposed on the second active layer. The second source electrode 133b is disposed on the second ohmic contact layer and is connected to the second data line "DL2". The second drain electrode 136b is disposed on the second ohmic contact layer and is spaced apart from the second source electrode 133b.

In the first pixel region "P1", the first pixel electrode 140, which contacts the first drain electrode 136a, is disposed. In addition, the second pixel electrode 150, which contacts the second drain electrode 136b, is disposed and is alternately arranged with the first pixel electrode 140. A horizontal electric field is generated between the first and second pixel electrodes 140 and 150.

In the pixel region "P2" of the second pixel line "PL2" (of FIG. 3), the third and fourth TFTs "T3" and "T4" are disposed. In FIG. 6, the third TFT "T3" is connected to the second gate line "GL2" and the second data line "DL2". Similar to the first TFT "T1", the third TFT "T3" includes a third gate electrode (not shown), a third gate insulating layer (not shown), a third active layer (not shown) of intrinsic amorphous silicon, a third ohmic contact layer (not shown) of impurity-doped amorphous silicon, a third source electrode (not shown) and a third drain electrode (not shown). The third gate electrode is connected to the second gate line "GL2", and the third gate insulating layer covers the third gate electrode. The third active layer is disposed on the third gate insulating layer and overlaps the third gate electrode. The third ohmic contact layer is disposed on the third active layer. The third source electrode is disposed on the third ohmic contact layer and is connected to the second data line "DL2". The third drain electrode is disposed on the third ohmic contact layer and is spaced apart from the third source electrode.

The fourth TFT "T4" is connected to the second gate line "GL2" and the third data line "DL3". Similar to the second TFT "T2", the fourth TFT "T4" includes a fourth gate electrode (not shown), a fourth gate insulating layer (not shown), a fourth active layer (not shown) of intrinsic amorphous silicon, a fourth ohmic contact layer (not shown) of impurity-doped amorphous silicon, a fourth source electrode (not shown) and a fourth drain electrode(not shown). The fourth gate electrode is connected to the second gate line "GL2", and the fourth gate insulating layer covers the fourth gate electrode. The fourth active layer is disposed on the fourth gate insulating layer and overlaps the fourth gate electrode. The fourth ohmic contact layer is disposed on the fourth active layer. The fourth source electrode is disposed on the fourth ohmic contact layer and is connected to the third data line "DL3". The fourth drain electrode is disposed on the fourth ohmic contact layer and is spaced apart from the fourth source electrode.

In the second pixel region "P2", the first pixel electrode 140, which contacts the third drain electrode, is disposed. In addition, the second pixel electrode 150, which contacts the fourth drain electrode, is disposed and is alternately arranged with the first pixel electrode 140. A horizontal electric field is generated between the first and second pixel electrodes 140 and 150 in the second pixel region "P2".

First and second data voltages, which have different phases, are supplied to the first and second pixel electrodes 140 and 150 in the first pixel region "P1" through the first and second data lines "DL1" and "DL2", respectively, and the first and second pixel electrodes 140 and 150 in the second pixel region "P2" through the second and third data lines "DL2" and "DL3", respectively. For example, one of the first and second data voltages is a positive voltage, and the other one of the first and second data voltages is a negative voltage. Since a voltage difference between the first and second pixel electrodes in the LCD device according to the present invention is twice as much as that in the related art LCD device, the liquid crystal layer is powerfully driven. Since the liquid crystal layer can be driven by the smaller voltages, a driving voltage is decreased such that power consumption is also decreased.

In addition, since each of the first and second pixel electrodes 140 and 150 has a bent portion and is generally symmetric with respect to the bent portion, the blue phase LCD device according to the present invention has multi-domains. As a result, there is no color shift problem with a wide viewing angle. In addition, there is no image distorting problem.

Figure 7:
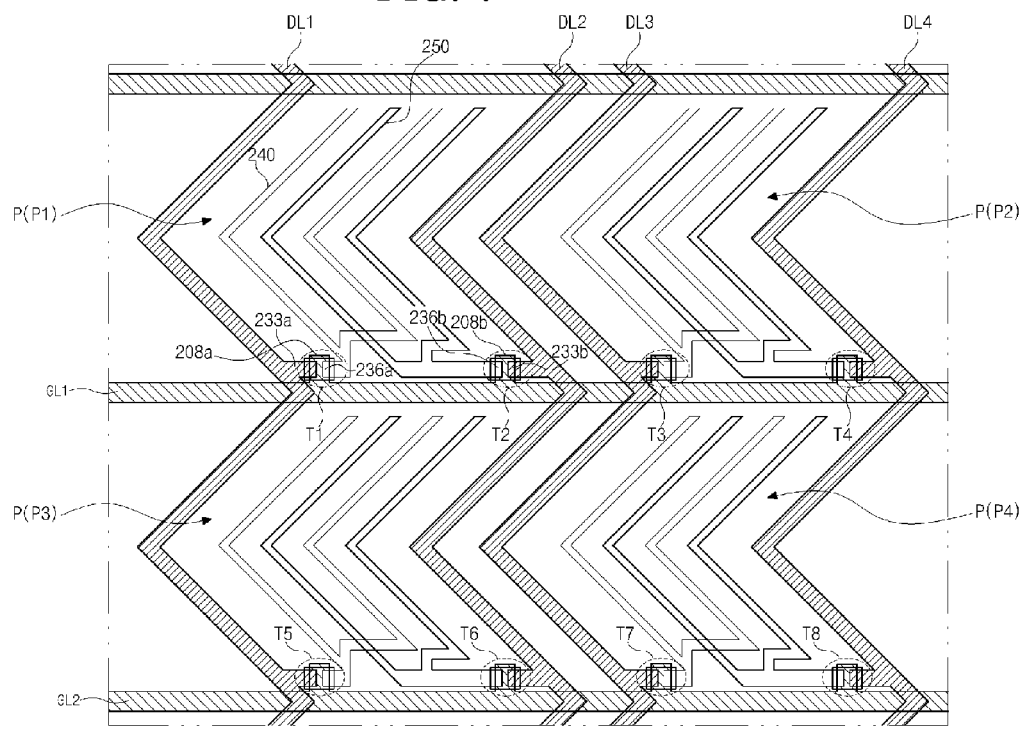
FIG. 7 is a plane view of an array substrate of a blue phase LCD device according to the present invention.

FIG. 7 is a plane view of an array substrate of a blue phase LCD device according to the present invention. As shown in FIG. 7, each of the first and second pixel electrodes 240 and 250 is oblique to the gate lines GL1 and GL2 and has a bent portion. Each of the first and second pixel electrodes 240 and 250 has a generally symmetric shape with respect to the bent portion.

In the array substrate, first and second gate lines "GL1" and "GL2" and first to fourth data lines "DL1", "DL2", "DL3" and "DL4" are disposed on a substrate. The first and second gate lines "GL1" and "GL2" cross the first to fourth data lines "DL1", "DL2", "DL3" and "DL4" to define first to fourth pixel regions "P1", "P2", "P3" and "P4". For example, each of the first and second pixel electrodes 240 and 250 in each of the first to fourth pixel regions "P1", "P2", "P3" and "P4" has an angle of about 45 degrees with respect to a line parallel to the gate lines "GL1" and "GL2" to form multi-domains. As a result, there is no color shift problem with a wide viewing angle. In addition, there is no image distorting problem. Furthermore, the liquid crystal molecules are arranged by 90 degrees with one another such that a viewing angle dependency is overcome.

In this case, a polarizing axis of first and second polarizing plates (not shown), which are respectively disposed on an outer side of the substrate for the array substrate and an outer side of a substrate for the color filter substrate, is oblique to the first and second pixel electrodes 240 and 250 and perpendicular to each other. For example, the polarizing axis of first and second polarizing plates has an angle of about 45 degrees with respect to the first and second pixel electrodes 240 and 250. Namely, the polarizing axis of the first polarizing plate is perpendicular to the gate lines "GL1" and "GL2", and the polarizing axis of the second polarizing plate is parallel to the gate lines "GL1" and "GL2".

Two TFTs are disposed in each of the first to fourth pixel regions "P1", "P2", "P3" and "P4". In the first pixel region "P1", the first TFT "T1" is connected to the first gate line "GL1" and the first data line "DL1", and the second TFT "T2" is connected to the first gate line "GL1" and the second data line "DL2". In the second pixel region "P2", the third TFT "T3" is connected to the first gate line "GL1" and the third data line "DL3", and the fourth TFT "T4" is connected to the first gate line "GL1" and the fourth data line "DL4". In the third pixel region "P3", the fifth TFT "T5" is connected to the second gate line "GL2" and the first data line "DL1", and the sixth TFT "T6" is connected to the second gate line "GL2" and the second data line "DL2". In the fourth pixel region "P4", the seventh TFT "T7" is connected to the second gate line "GL2" and the third data line "DL3", and the eighth TFT "T8" is connected to the second gate line "GL2" and the fourth data line "DL4".

For example, the first TFT "T1" includes a first gate electrode 208a, a first gate insulating layer (not shown), a first active layer (not shown) of intrinsic amorphous silicon, a first ohmic contact layer (not shown) of impurity-doped amorphous silicon, a first source electrode 233a and a first drain electrode 236a. The first gate electrode 208a is connected to the first gate line "GL1", and the first gate insulating layer covers the first gate electrode 208a. The first active layer is disposed on the first gate insulating layer and overlaps the first gate electrode 208a. The first ohmic contact layer is disposed on the first active layer. The first source electrode 233a is disposed on the first ohmic contact layer and is connected to the first data line "DL1". The first drain electrode 236a is disposed on the first ohmic contact layer and is spaced apart from the first source electrode 233a.

The second TFT "T2" is connected to the first gate line "GL1" and the second data line "DL2". The second TFT "T2" includes a second gate electrode 208b, a second gate insulating layer (not shown), a second active layer (not shown) of intrinsic amorphous silicon, a second ohmic contact layer (not shown) of impurity-doped amorphous silicon, a second source electrode 233b and a second drain electrode 236b. The second gate electrode 208b is connected to the first gate line "GL1", and the second gate insulating layer covers the second gate electrode 208b. The second active layer is disposed on the second gate insulating layer and overlaps the second gate electrode 208b. The second ohmic contact layer is disposed on the second active layer. The second source electrode 233b is disposed on the second ohmic contact layer and is connected to the second data line "DL2". The second drain electrode 236b is disposed on the second ohmic contact layer and is spaced apart from the second source electrode 233b.

In the first pixel region "P1", the first pixel electrode 240, which contacts the first drain electrode 236a, is disposed. In addition, the second pixel electrode 250, which contacts the second drain electrode 236b, is disposed and is alternately arranged with the first pixel electrode 240. A horizontal electric field is generated between the first and second pixel electrodes 240 and 250.

Different from the array substrate in FIG. 6, the third TFT "T3" in the second pixel region "P2" (of FIG. 7) does not share the second data line "DL2" (of FIG. 6) with the second TFT "T2" in the first pixel region "P1". Namely, the second TFT "T2" in the first pixel region "P1" is connected to the second data line "DL2", while the third TFT "T3" in the second pixel region "P2" is connected to the third data line "DL3".

In addition, different from the array substrate in FIG. 6, the TFTs "T1" and "T2" in the first pixel region "P1" (of FIG. 7) share the first gate line "GL1" with the TFTs "T3" and "T4" in the second pixel region "P2".

First and second data voltages, which have different phases, are supplied to the first and second pixel electrodes 240 and 250 in the first pixel region "P1" through the first and second data lines "DL1" and "DL2", respectively, and the first and second pixel electrodes 240 and 250 in the second pixel region "P2" through the third and fourth data lines "DL3" and "DL4", respectively. For example, one of the first and second data voltages is a positive voltage, and the other one of the first and second data voltages is a negative voltage. Since a voltage difference between the first and second pixel electrodes in the LCD device according to the present invention is twice as much as that in the related art LCD device, the liquid crystal layer is powerfully driven. Since the liquid crystal layer can be driven by the smaller voltages, a driving voltage is decreased such that power consumption is also decreased.

In addition, since each of the first and second pixel electrodes 240 and 250 has a bent portion to be generally symmetric with respect to the bent portion; the blue phase LCD device according to the present invention has multi-domains. As a result, there is no color shift problem with a wide viewing angle. In addition, there is no image distorting problem.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A blue phase liquid crystal display device, comprising:
a first substrate having a first pixel region;
a first gate line on the first substrate;
first and second data lines on the first substrate and crossing the first gate line;
a first thin film transistor (TFT) and a second TFT disposed in the first pixel region, the first TFT connected to the first gate line and the first data line, and the second TFT connected to the first gate line and the second data line;
a first pixel electrode in the first pixel region and connected to the first TFT, and a second pixel electrode in the first pixel region and connected to the second TFT, the first pixel electrode alternately arranged with the second pixel electrode such that the first pixel electrode is positioned between the first data line and the second pixel electrode in a plane view, wherein an electric field, which is substantially parallel to a surface of the first substrate, is generated between the first and second pixel electrodes;
a second substrate facing the first substrate; and
a liquid crystal layer between the first and second substrates, the liquid crystal layer having an optical isotropic property without an electric field and a birefringence property with the electric field,
wherein the first TFT and the second TFT are switched by a gate signal through the first gate line, and wherein a first signal from the first data line is applied into the first pixel electrode through the first TFT, and a second signal from the second data line is applied into the second pixel electrode through the second TFT.

2. The device according to claim 1, wherein each of the first and second TFTs includes:
a gate electrode connected to the first gate line;
a source electrode connected to one of the first and second data lines; and
a drain electrode spaced apart from the source electrode.

3. The device according to claim 1, wherein each of the first and second pixel electrodes includes a bent portion and has a generally symmetric shape with respect to the bent portion.

4. The device according to claim 3, wherein the each of first and second pixel electrodes has an angle of about 45 degrees with respect to the first gate line.

5. The device according to claim 1, further comprising a first polarizing plate on an outer side of the first substrate, and a second polarizing plate on an outer side of the second substrate, wherein a polarizing axis of each of the first and second polarizing plates are oblique to at least one of the first and second pixel electrodes.

6. The device according to claim 5, wherein the polarizing axis of the first polarizing plate is perpendicular to the polarizing axis of the second polarizing plate.

7. The device according to claim 1, wherein the liquid crystal layer comprises blue phase liquid crystal molecules.

8. The device according to claim 1, wherein the first substrate has a second pixel region, and further comprising:
a second gate line on the first substrate;
a third data line on the first substrate and crossing the first and second gate lines, the first and second gate lines and the first and second data lines surrounding the first pixel region, and the first and second gate lines and the second and third data lines surrounding the second pixel region;
a third TFT and a fourth TFT disposed in the second pixel region, the third TFT connected to the second gate line and the second data line, and the fourth TFT connected to the second gate line and the third data line; and
a third pixel electrode in the second pixel region and connected to the third TFT, and a fourth pixel electrode in the second pixel region and connected to the fourth TFT, the third pixel electrode alternately arranged with the fourth pixel electrode.

9. The device according to claim 8, wherein each of the first to fourth TFTs includes:
a gate electrode connected to one of the first and second gate lines;
a source electrode connected to one of the first to third data lines; and
a drain electrode spaced apart from the source electrode.

10. The device according to claim 8, wherein majority portions of the first through fourth pixel electrodes are arranged at generally 45 degrees with respect to the first and second gate lines.

11. The device according to claim 10, further comprising a first polarizing plate at an outer side of the first substrate, and a second polarizing plate at an outer side of the second substrate, wherein a polarizing axis of the first polarizing plate is perpendicular to the polarizing axis of the second polarizing plate, and the polarizing axis of the first polarizing plate and the polarizing axis of the second polarizing plate are arranged at generally 45 degrees with respect to the majority portions of the first through fourth pixel electrodes.

12. The device according to claim 8, wherein the liquid crystal layer comprises blue phase liquid crystal molecules.

13. The device according to claim 1, wherein the first substrate has a second pixel region, and further comprising:
third and fourth data lines on the first substrate and crossing the first gate line;
a third TFT and a fourth TFT disposed in the second pixel region, the third TFT connected to the first gate line and the third data line, and the fourth TFT connected to the first gate line and the fourth data line;
a third pixel electrode in the second pixel region and connected to the third TFT, and a fourth pixel electrode in the second pixel region and connected to the fourth TFT, the third pixel electrode alternately arranged with the fourth pixel electrode.

14. The device according to claim 13, wherein majority portions of the first through fourth pixel electrodes are arranged at generally 45 degrees with respect to the first gate line.

15. The device according to claim 14, further comprising a first polarizing plate at an outer side of the first substrate, and a second polarizing plate at an outer side of the second substrate, wherein a polarizing axis of the first polarizing plate is perpendicular to the polarizing axis of the second polarizing plate, and the polarizing axis of the first polarizing plate and the polarizing axis of the second polarizing plate are arranged at generally 45 degrees with respect to the majority portions of the first through fourth pixel electrodes.

16. The device according to claim 13, wherein the liquid crystal layer comprises blue phase liquid crystal molecules.

17. The device according to claim 13, wherein the substrate has third and fourth pixel regions, the first to fourth pixel regions arranged in a two by two matrix shape, and further comprising:
a second gate line on a first substrate, the first to fourth data lines crossing the first and second gate lines to define the first to fourth pixel regions;
a fifth TFT and a sixth TFT disposed in the third pixel region, the fifth TFT connected to the second gate line and the first data line, and the sixth TFT connected to the second gate line and the second data line;
a fifth pixel electrode in the third pixel region and connected to the fifth TFT, and a sixth pixel electrode in the third pixel region and connected to the sixth TFT, the fifth pixel electrode alternately arranged with the sixth pixel electrode;
a seventh TFT and an eighth TFT disposed in the fourth pixel region, the seventh TFT connected to the second gate line and the third data line, and the eighth TFT connected to the second gate line and the fourth data line; and
a seventh pixel electrode in the fourth pixel region and connected to the seventh TFT, and an eighth pixel electrode in the fourth pixel region and connected to the eighth TFT, the seventh pixel electrode alternately arranged with the eighth pixel electrode.

18. The device according to claim 17, wherein majority portions of the first through eighth pixel electrodes are arranged at generally 45 degrees with respect to the first and second gate lines.

19. The device according to claim 18, further comprising a first polarizing plate at an outer side of the first substrate, and a second polarizing plate at an outer side of the second substrate, wherein a polarizing axis of the first polarizing plate is perpendicular to the polarizing axis of the second polarizing plate, and the polarizing axis of the first polarizing plate and the polarizing axis of the second polarizing plate are arranged at generally 45 degrees with respect to the majority portions of the first through eighth pixel electrodes.

20. The device according to claim 17, wherein the liquid crystal layer comprises blue phase liquid crystal molecules.

21. The device according to claim 1, wherein the liquid crystal layer includes a material selected from formulas I to III below:

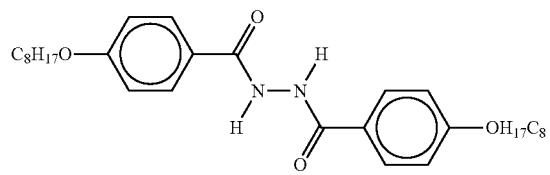

-continued
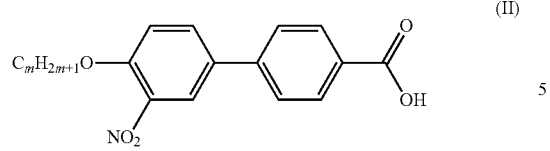
(II)
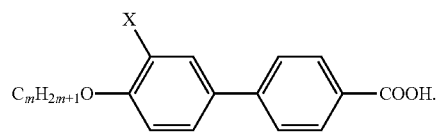
(III)
* * * * *